(12) United States Patent
Santhanakrishnan et al.

(10) Patent No.: US 8,079,031 B2
(45) Date of Patent: Dec. 13, 2011

(54) METHOD, APPARATUS, AND A SYSTEM FOR DYNAMICALLY CONFIGURING A PREFETCHER BASED ON A THREAD SPECIFIC LATENCY METRIC

(75) Inventors: Geeyarpuram N. Santhanakrishnan, Hillsboro, OR (US); Michael F. Cole, Portland, OR (US); Mark Rowland, Beaverton, OR (US); Ganapati Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1495 days.

(21) Appl. No.: 11/256,536

(22) Filed: Oct. 21, 2005

(65) Prior Publication Data

US 2007/0094453 A1 Apr. 26, 2007

(51) Int. Cl.
*G06F 9/46* (2006.01)
(52) U.S. Cl. ...................... 718/100; 712/207
(58) Field of Classification Search .............. 712/207; 718/100
See application file for complete search history.

(56) References Cited

U.S. PATENT DOCUMENTS

| | | | | |
|---|---|---|---|---|
| 4,271,486 | A * | 6/1981 | Dagostino et al. | 365/45 |
| 5,964,867 | A * | 10/1999 | Anderson et al. | 712/219 |
| 6,453,389 | B1 * | 9/2002 | Weinberger et al. | 711/137 |
| 6,456,632 | B1 * | 9/2002 | Baum et al. | 370/490 |
| 6,560,693 | B1 | 5/2003 | Puzak et al. | |
| 6,571,318 | B1 * | 5/2003 | Sander et al. | 711/137 |
| 6,697,935 | B1 | 2/2004 | Borkenhagen et al. | |
| 6,721,870 | B1 * | 4/2004 | Yochai et al. | 711/204 |
| 7,073,030 | B2 * | 7/2006 | Azevedo et al. | 711/136 |
| 7,096,390 | B2 * | 8/2006 | Talcott et al. | 714/45 |
| 7,228,387 | B2 | 6/2007 | Cai et al. | |
| 2003/0188226 | A1 | 10/2003 | Talcott | |
| 2004/0268050 | A1 * | 12/2004 | Cai et al. | 711/137 |
| 2006/0212867 | A1 * | 9/2006 | Fields et al. | 718/100 |

FOREIGN PATENT DOCUMENTS

| | | |
|---|---|---|
| CN | 1276888 A | 12/2000 |
| CN | 1549968 | 11/2004 |
| EP | 0777181 | 6/1997 |
| EP | 1 783 603 A3 | 6/2008 |
| TW | 200405204 A | 1/2004 |
| WO | WO-9921081 | 4/1999 |
| WO | WO-03021438 | 3/2003 |

OTHER PUBLICATIONS

Office Action from foreign counterpart China Patent Application No. 200610164123.4, mailed Dec. 14, 2007, 29 pages (Translation included).

Search Report from foreign counterpart European Patent Application No. 06255445.6, mailed Apr. 25, 2008, 7 pages.

(Continued)

*Primary Examiner* — Meng A An
*Assistant Examiner* — Blake Kumabe
(74) *Attorney, Agent, or Firm* — Blakely, Sokoloff, Taylor & Zafman LLP

(57) ABSTRACT

A discussion of a dynamic configuration for a prefetcher is proposed. For example, a thread specific latency metric is calculated and provides dynamic feedback to the software on a per thread basis via the configuration and status registers. Likewise, the software can optionally use the information from the registers to dynamically configure the prefetching behavior and allows the software to be able to both query the performance and configure the prefetcher.

18 Claims, 9 Drawing Sheets

OTHER PUBLICATIONS

Official Letter and Search Report from foreign counterpart Taiwan Patent Application No. 95138982, mailed Sep. 7, 2010, 14 pages. (Translation not included).

First Office Action from foreign counterpart Taiwan Patent Application No. 95138982, mailed Feb. 12, 2010, 11 pages. (Translation not included).

Official Letter and Search Report from foreign counterpart Taiwan Patent Application No. 95138982, mailed Apr. 8, 2011, 3 pages. (Translation not included).

Decision on Rejection from foreign counterpart China Patent Application No. 200610164123.4, mailed Jan. 8, 2010, 24 pages. (Translation included).

* cited by examiner

METHOD, APPARATUS, AND A SYSTEM FOR DYNAMICALLY CONFIGURING A PREFETCHER BASED ON A THREAD SPECIFIC LATENCY METRIC

FIELD OF THE INVENTION

One or more embodiments of the invention relate generally to the field of instruction/data prefetching. More particularly, one or more of the embodiments of the invention relates to a method, system, and an apparatus for a software configurable prefetcher

BACKGROUND OF THE INVENTION

Modern computer systems exhibit a significant bottleneck between processors and system memory. As a result, a substantial amount of latency is incurred for completion of memory requests issued by a processor. One technique for reducing or avoiding latency between the processor and system memory is the use of data caches. As a result, computer systems may store requested data within volatile memory devices, such as cache memory devices. Accordingly, when a processor requires memory, the processor checks the data cache to determine whether the data is readily available and gather the data from such temporary memory devices to avoid the bottleneck that exists between processors and system memory.

Unfortunately, current computer systems consume an inordinate percentage of execution cycles solely on data cache. As a result, the program is halted until the data can be gathered from main memory. Unfortunately, substantial cache misses have a significant detrimental effect on the execution time and efficiency of user programs. One technique for reducing the amount of time required to process memory references is data prefetching. Data prefetching refers to a technique which attempts to predict or anticipate data loads. Once the data loads are anticipated, the data is preloaded or prefetched within a temporary memory in order to avoid data cache misses.

Accordingly, traditional instruction on data prefetching mechanisms focus on requested address patterns. These prefetch mechanisms aim to accurately predict which memory lines will be requested in the future based on what has been recently requested. However, prefetching can rapidly increase memory subsystem usage. The relationship between system memory, access latency and high memory subsystem usage negatively impacts the prefetching mechanism's effectiveness. In some symmetric multiprocessor (SMP) systems as well as chip multiprocessor (CMP) systems, aggressive prefetching drives up the memory subsystem usage, thereby increasing latency to the point that system performance is below non-prefetching levels.

Traditionally, prefetching solutions have either been implemented in hardware or software. For example, hardware prefetching solutions typically scan for patterns and inserts prefetch transactions in the system (using utilization-based throttling mechanisms). In contrast, software explicitly generates prefetches or provides hints to the hardware instructions or hints inserted into the application. However, both approaches have severe limitations. Hardware penalizes the system even if the utilization of the system is high due to useful prefetches, in contrast, software prefetching, adversely impacts application portability and has undesirable ISA (Instruction Set Architecture) effects. Furthermore, as processors evolve into multi core configurations that support multi-threading, simultaneous execution of heterogeneous workloads for a multi-threaded computer system exacerbates the problem. Therefore, present solutions are static and inflexible and are not based on dynamic system performance. Furthermore, another limitation is an absence of feedback between hardware and software.

One example of a typical prefetch control block is depicted in FIG. 1. A queue 102 stores a fixed number of cache lines from the cache 106, the fixed number of cache lines based on control from the prefetch control block 104. This typical prefetch control block has several limitations, such as, a fixed number of cache lines available in the queue and the number of prefetched cache lines does not depend on the number of threads and type of threads in the various applications that are being executed by the system.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

An area of current technological development relates to improving system performance with prefetching. As previously described, hardware penalizes the system even if the utilization of the system is high due to useful prefetches. Software prefetching, adversely impacts application portability and has undesirable ISA (Instruction Set Architecture) effects. Furthermore, as processors evolve into multi core configurations that support multi-threading, simultaneous execution of heterogeneous workloads for a multi-threaded computer system exacerbates the problem.

In contrast, this proposal allows for a thread aware hardware prefetcher that could be dynamically configured by software. The proposed prefetcher utilizes a parameterized prefetcher, a thread-wise latency monitor, and configuration and status registers. This proposal supports one or all of the different types of prefetching behaviors, such as, throttling prefetching when system resource utilization is high, task-specific prefetching profiles, and software-managed prefetcher adaptation that allows a single thread to have different prefetching profiles in different parts of its code. Furthermore, the hardware prefetcher provides dynamic feedback to the software on a per thread basis, via the configuration and status registers. Thus, the software can optionally use the information from the registers to dynamically configure the prefetching behavior and allows the software to be able to both query the performance and configure the prefetcher.

Figure 1:
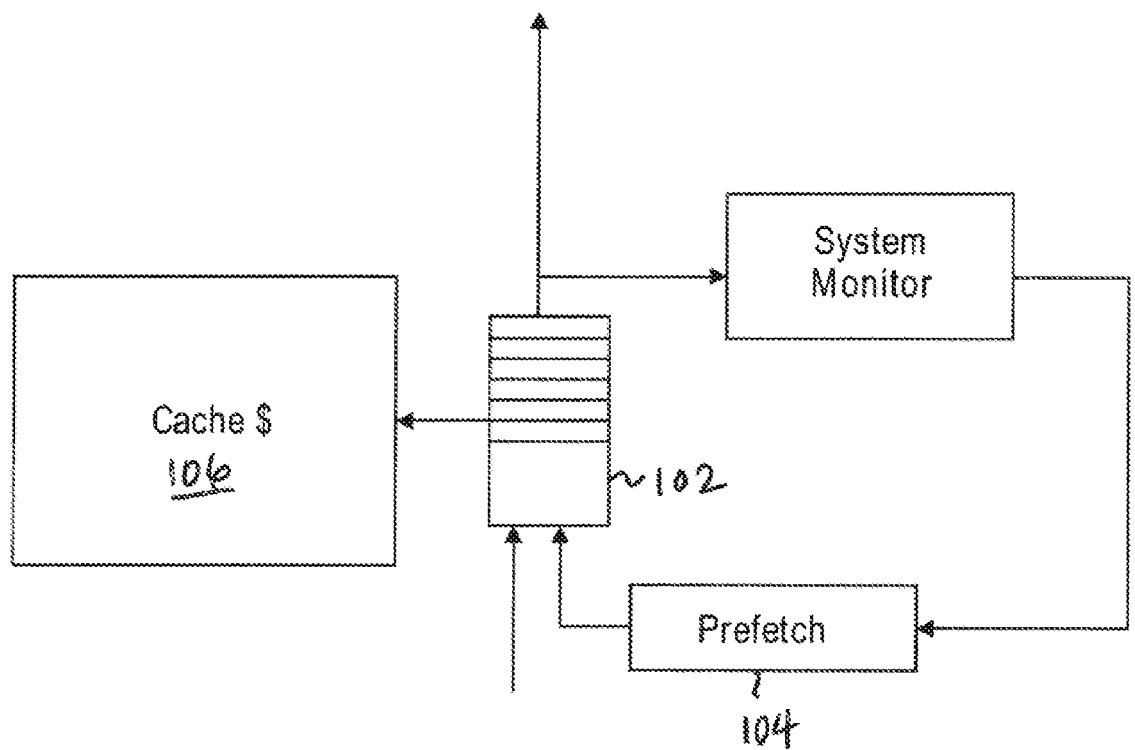
FIG. 1 is prior art.
Figure 2:
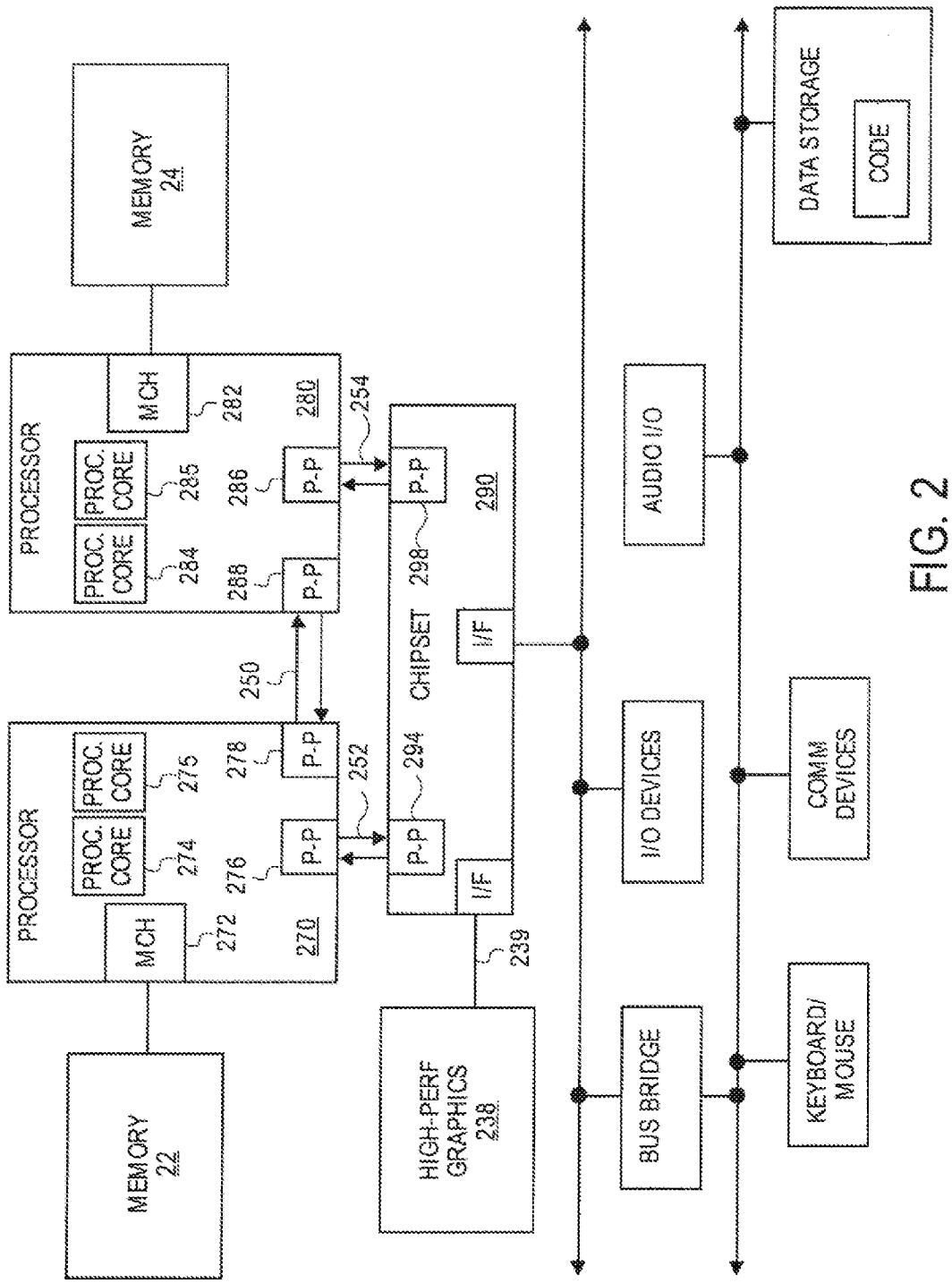
FIG. 2 is a system as utilized by one embodiment of the claimed subject matter.

FIG. 2 is a system as utilized by one embodiment of the claimed subject matter.

In particular, FIG. 2 shows a system where processors, memory, and input/output devices are interconnected by a number of point-to-point interfaces.

The system of FIG. 2 may also include several processors, of which only two, processors 270, 280 are shown for clarity. Processors 270, 280 may each include a memory controller or a local memory controller hub (MCH) 272, 282 to connect with memory 22, 24. In one embodiment, the memories 22 and 24 are DRAM and/or a cache memory. In one embodiment, the cache memory could be any level of cache memory used by a processor. In one embodiment, processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. In one embodiment, the processors 270 and 280 would have multiple processor cores. 274, 275 and 284, 285 respectively. However, the claimed subject matter is not limited to each processor having two processor cores. The embodiment of two processor cores is merely one example and one skilled in the art appreciates utilizing a different number of processor cores for each processor based at least in part on the die size requirements, processing specifications, power limitations, etc. . . .

Chipset 290 may also exchange data with a high-performance graphics circuit 238 via a high-performance graphics interface 239.

Figure 6:
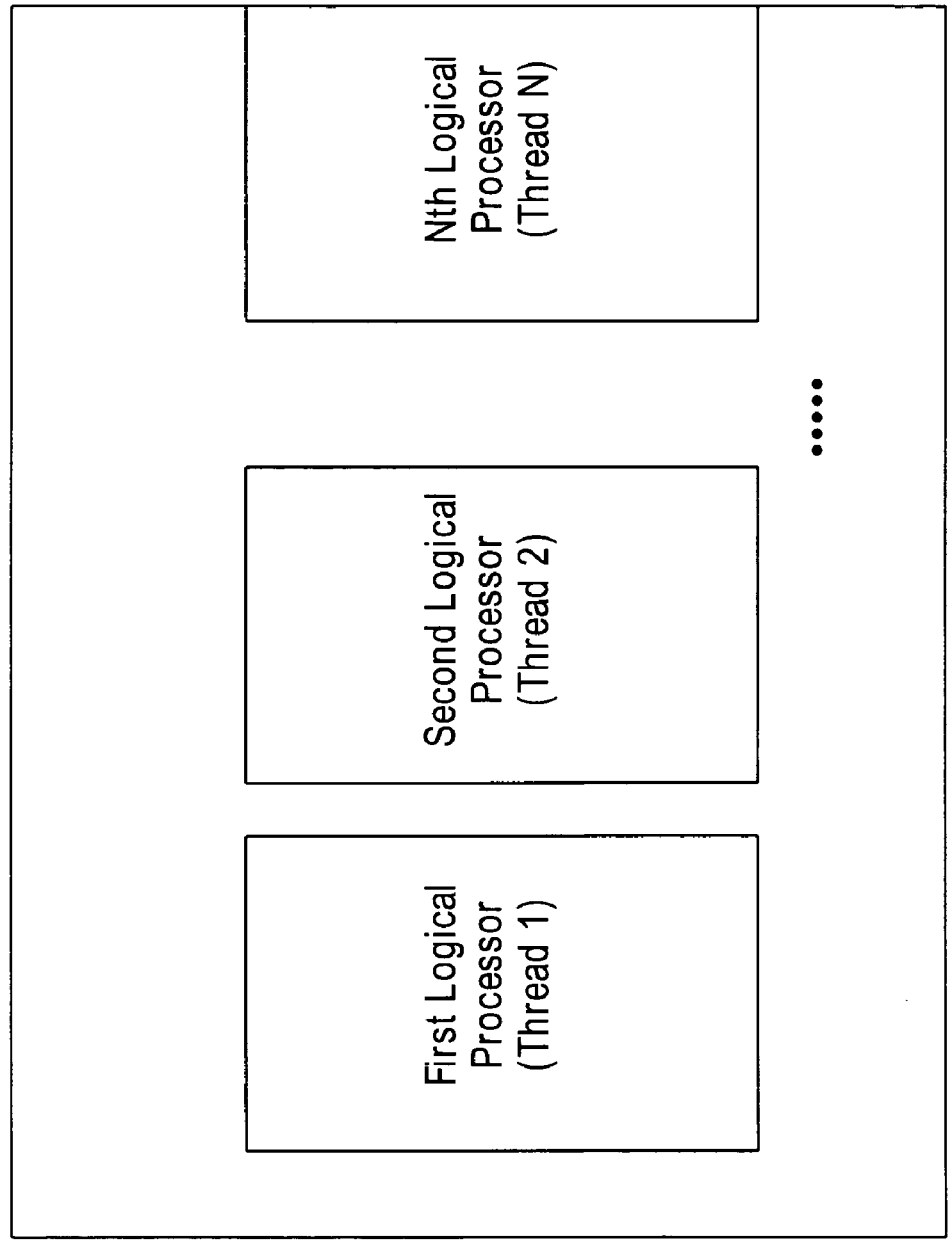
FIG. 6 depicts a processor that supports multithreading as utilized by one embodiment of the claimed subject matter.

In one embodiment, each processor may support multi threading as depicted in connection with FIG. 6.

At least one embodiment of the invention may be located within the PtP interface circuits within each of the PtP bus agents of FIG. 2. Other embodiments of the invention, however, may exist in other circuits, logic units, or devices within the system of FIG. 2. Furthermore, other embodiments of the invention may be distributed throughout several circuits, logic units, or devices illustrated in FIG. 2.

Figure 3:
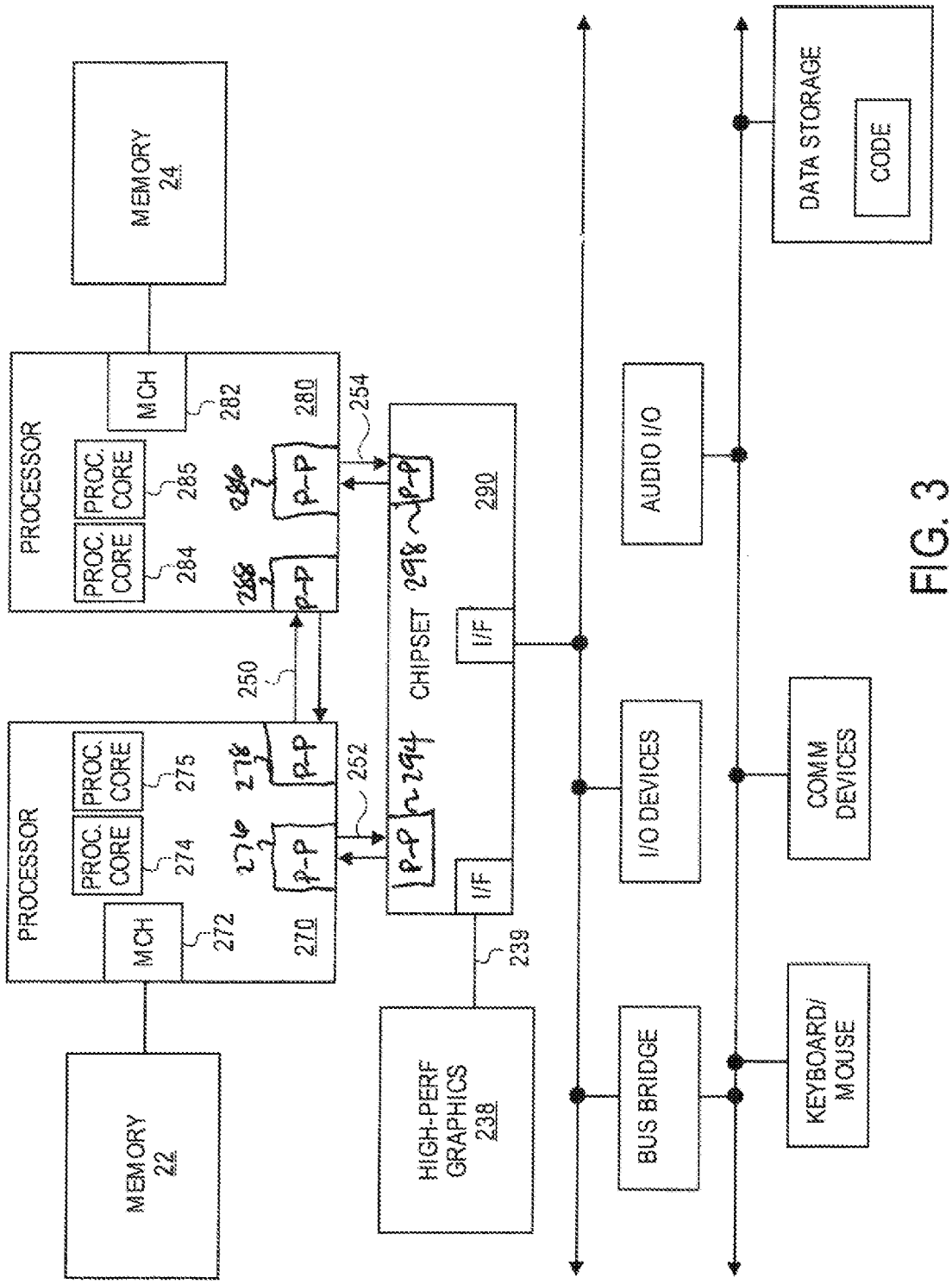
FIG. 3 is a system as utilized by one embodiment of the claimed subject matter.

FIG. 3 is a system as utilized by one embodiment of the claimed subject matter.

In particular, FIG. 3 shows a system where processors, memory, and input/output devices are interconnected by a front side bus (FSB).

The system of FIG. 3 may also include several processors, of which only two, processors 270, 280 are shown for clarity. In one embodiment, the processors 270 and 280 have a single processor core. In another embodiment, the processors 270 and 280 have two processor cores, as depicted in the figure. The Processors 270, 280 may each include a memory controller or a local memory controller hub (MCH) 272, 282 to connect with memory 22, 24. In one embodiment, the memories 22 and 24 are DRAM and/or a cache memory. In one embodiment, the cache memory could be any level of cache memory used by a processor. In one embodiment, processors 270, 280 may exchange data via a point-to-point (PtP) interface 250 using PtP interface circuits 278, 288. Processors 270, 280 may each exchange data with a chipset 290 via a front side bus. Chipset 290 may also exchange data with a high-performance graphics circuit 238 via a high-performance graphics interface 239.

In one embodiment, each processor may support multi threading as depicted in connection with FIG. 6. In one embodiment, one example of a point to point connection is depicted in connection with FIGS. 7 and 8.

Furthermore, other embodiments of the invention may be distributed throughout several circuits, logic units, or devices illustrated in FIG. 3.

Figure 4A:
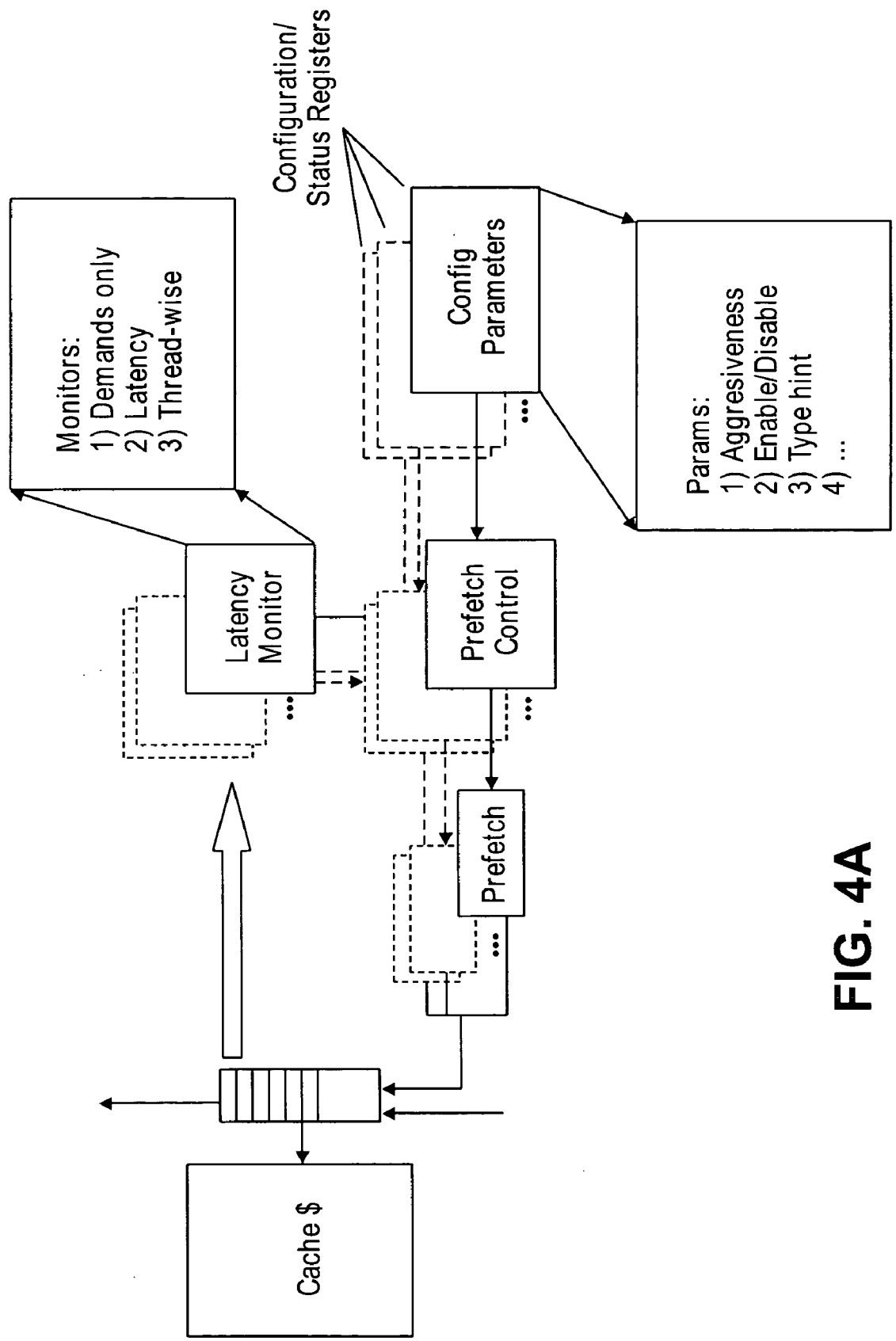
FIG. 4A is an apparatus as utilized by one embodiment of the claimed subject matter.

FIG. 4 is an apparatus as utilized by one embodiment of the claimed subject matter. The depicted apparatus facilitates an dynamically configurable and thread aware prefetcher. In one embodiment, the sub components of the prefetcher are a parameterized prefetcher, a thread-wise latency monitor, and configuration/status registers to store the parameters.

As previously discussed, the hardware prefetcher provides dynamic feedback to the software on a per thread basis, via the configuration and status registers. Thus, the software can optionally use the information from the registers to dynamically configure the prefetching behavior and allows the software to be able to both query the performance and configure the prefetcher. FIG. 4 depicts the configuration and status registers and the software flowchart is discussed in further detail in connection with the flowchart of FIG. 5.

The parameterized prefetcher allows for different amounts of prefetching based on an index value. For example, in one embodiment, a two bit aggressiveness index defines the amount of prefetching, such as, the number of cache lines to prefetch. The two bit aggressiveness index ranges from a binary value of zero that indicates no prefetching to a binary value of three that indicates maximum prefetching. In this embodiment, the binary value of three for the index indicates prefetching up to ten cache lines, the binary value of two indicates prefetching up to eight cache lines, and the binary value of one indicates prefetching up to six cache lines. However, the claimed subject matter is not limited to the preceding two bit index and the number of cache lines for each binary value. The claimed subject matter allows for different bit assignments for the aggressiveness index and one skilled in the art appreciates utilizing a different number of prefetching cache lines for each binary value of the aggressiveness index based at least in part on the die size requirements, processing specifications, power limitations, etc. . . .

In one embodiment, the amount of cache lines that are prefetched also depends on the latency monitor metric (calculation of the metric is discussed in connection with FIG. 4B) that is analyzed on a per thread basis.

As previously discussed, the setting of the aggressiveness index may depend on the latency monitor metric. For example, one set of registers stores different latency trip points. The prefetcher will change behavior as the observed average latency crosses the trip points.

The claimed subject matter is not limited to the previous behaviors for the latency monitor metric. One skilled in the art appreciates utilizing one or all of the different behaviors for the latency monitor metric to reflect their prefetching profile or system and cache design.

In one embodiment, the configuration/status registers represent the interface of the system. The configuration registers are used to control the parameterization of the prefetcher. The prefetcher could be adjusted based on an aggressiveness index, type of instructions, and the previous time slice analysis (that is discussed in connection with FIG. 5). As previously described, one set of registers stores a number of latency trip points. The prefetcher will change behavior as the observed average latency crosses the trip points.

As previously mentioned, the prefetcher could be adjusted based on the type of application and whether the application is running a majority of floating point or integer operations. In one embodiment, the amount of prefetching may be increased when running a predominant amount of floating point instructions since floating point instructions are closely connected and local.

The configuration and status registers provide information about the system. One such piece of information will be the average latency as observed by the latency monitor. In one embodiment, the average latency is set to the exact value of the latency monitor metric. In contrast, for another embodiment, the average latency could be a latency index to represent a range of latency values. The prefetcher can also provide information about how well it is doing, such as, an efficiency index (, e.g. a derivative based on the number of times a prefetched line is actually used).

Figure 4B:
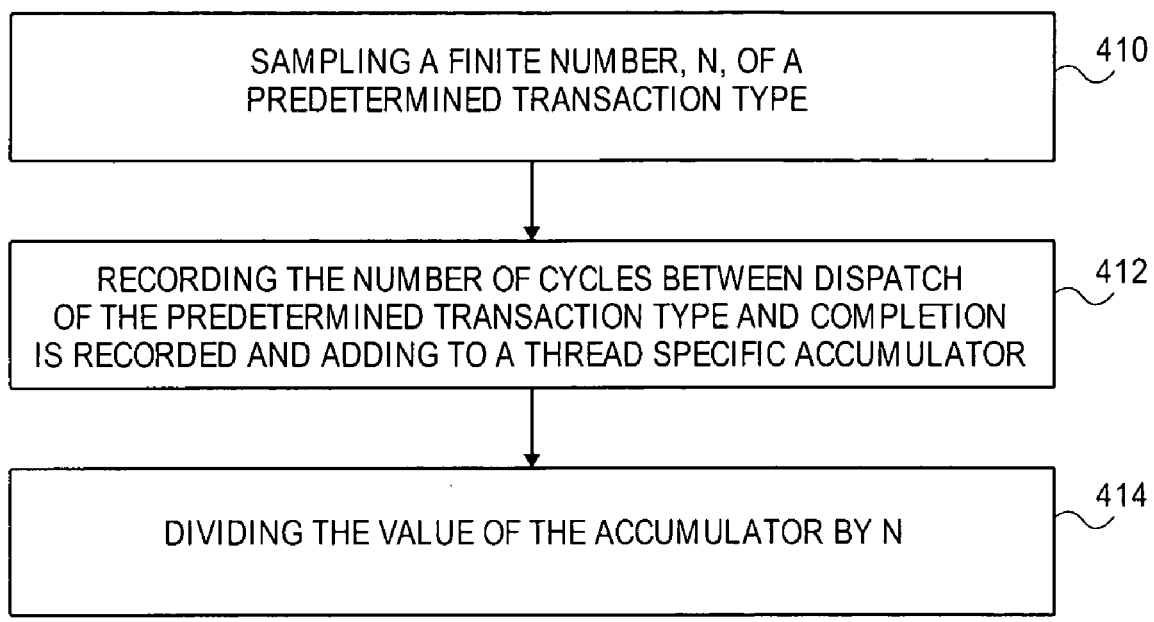
FIG. 4B is one embodiment of a method for calculating the thread specific metric.

FIG. 4B is one embodiment of a method for calculating the thread specific metric. The latency monitor analyzes latency, (such as, non-prefetcher load), in the system on a per thread basis and provides feedback to the dynamically adjusted prefetcher. For example, in one embodiment, the latency monitor samples a finite number (N) of a predetermined transaction type (in one embodiment, demand-load transactions), depicted in an execution block 410. For each demand-load transaction, the number of cycles between transaction dispatch and completion is recorded and added to a thread specific accumulator, depicted in an execution block 412.

The claimed subject matter is not limited to demand load transactions. One skilled in the art appreciates sampling one or more different types of instructions to calculate a thread specific metric.

Subsequently, once all N loads have been sampled, the value of the accumulator is divided by N, depicted in an execution block 414.

Thus, the resulting value represents average load latency in the system and this metric could be used to select the number of cache lines to be prefetched.

There is one latency monitor metric per thread and therefore the data collected inherently represents the specific characteristics of the given thread. Therefore, the latency monitoring metric estimates the average load-to-use time for all demand accesses for a cache. In one embodiment, the metric may be done for a particular level in the caching hierarchy or all levels of the caching hierarchy. In another embodiment, the metric does not focus only on the accesses that make it out to the system, ("misses"), but considers all demand accesses.

In one embodiment, the logic for calculating the latency monitor metric could be in a memory controller, chipset, processor, or ASIC. In this same embodiment, the logic for calculating the latency monitor is situated to allow visibility of the thread processing to facilitate the calculation of the metric.

Figure 5:
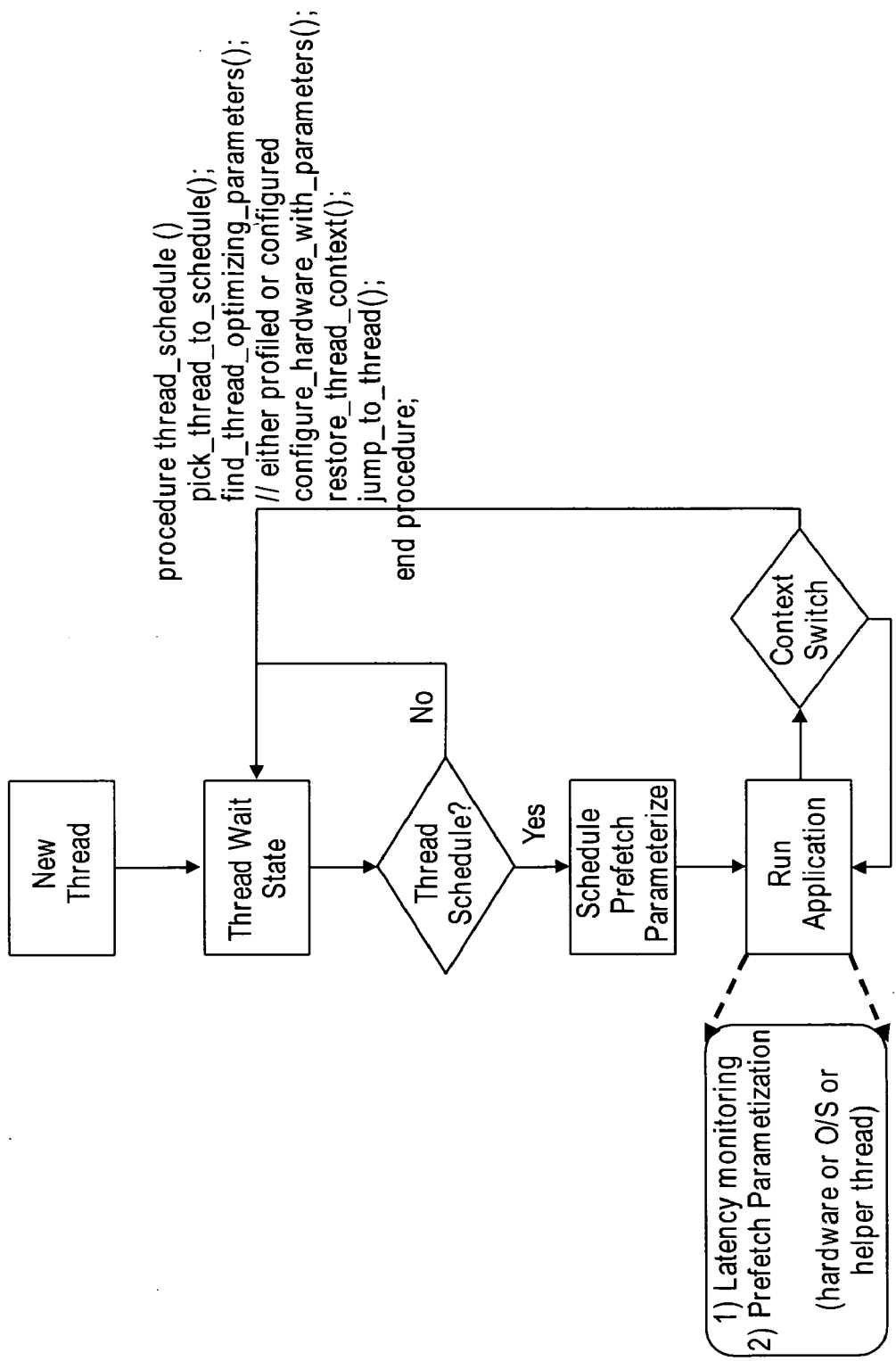
FIG. 5 is a method for a flowchart that represents a software's perspective as utilized by one embodiment of the claimed subject matter

FIG. 5 is a method for a flowchart that represents a software's perspective as utilized by one embodiment of the claimed subject matter.

The depicted flowchart illustrates how a thread is scheduled for processing with the ability to parameterize the prefetcher and perform a time slice analysis. As the new thread is to be processed for scheduling, it enters a wait state. Subsequently, the new thread is scheduled and the prefetcher is parameterized according to the previously discussed latency monitor metric and aggressiveness index that is stored in the configuration and status register (described earlier in connection with FIG. 4).

At the context switch decision block, a time slice analysis is performed. The time slice analysis is based at least in part on implementation specific parameters, some embodiments of which are prefetcher accuracy and load latencies. In addition, system parameters such as utilizations are also provided to the operating system. In typical operating system controlled systems, this information can be used by the OS in order to study the performance of the prefetcher in the particular time slice. This information in association with past behavior gives the OS an ability to predict the effectiveness of the prefetcher in the next time slice. The OS can then either increase the aggressiveness index of the prefetcher during the next time slice in case it deems such or decrease it otherwise. For example, if the thread specific metric is below a predetermined load latency for the system, then the software can increase the prefetching behavior of the processor to allow for more cache lines to be prefetched from a cache memory coupled to the processor in the next time slice. Otherwise, if the thread specific metric is above a predetermined load latency for the system, then the software can decrease the prefetching behavior of the processor to allow for less cache lines to be prefetched from a cache memory coupled to the processor in the next time slice.

As previously discussed, the software is able to both query the performance and configure the prefetcher. This "loop" enables the OS or a runtime-management environment to employ various prefetching schemes. In one embodiment, one scheme involves maintaining a thread prefetcher profile. Under this scheme, a context switch would include changing the prefetcher profile. This can be done based on performance data collected from the status registers. Alternatively, the software may use other information it has available. In particular, helper threads can monitor execution of end-user applications and adjust the prefetcher based on the particular section of code that is being executed.

One example of a software view of the hardware infrastructure is depicted in FIG. 5 with a coding as follows:

```
procedure thread_schedule ( )
    pick_thread_to_schedule( );
    find_thread_optimizing_parameters( );
    // either profiled or configured
    configure_hardware_with_parameters( );
    restore_thread_context( );
    jump_to_thread( );
end procedure;
```

FIG. 6 depicts a processor that supports multithreading as utilized by one embodiment of the claimed subject matter. In this embodiment, the processor 274 supports multithreading, which allows a single processor to perform several mathematical operations substantially simultaneously. For example, a multi-thread (MT) processor contains several independent "logical processors," or "threads" as depicted.

Figure 7:
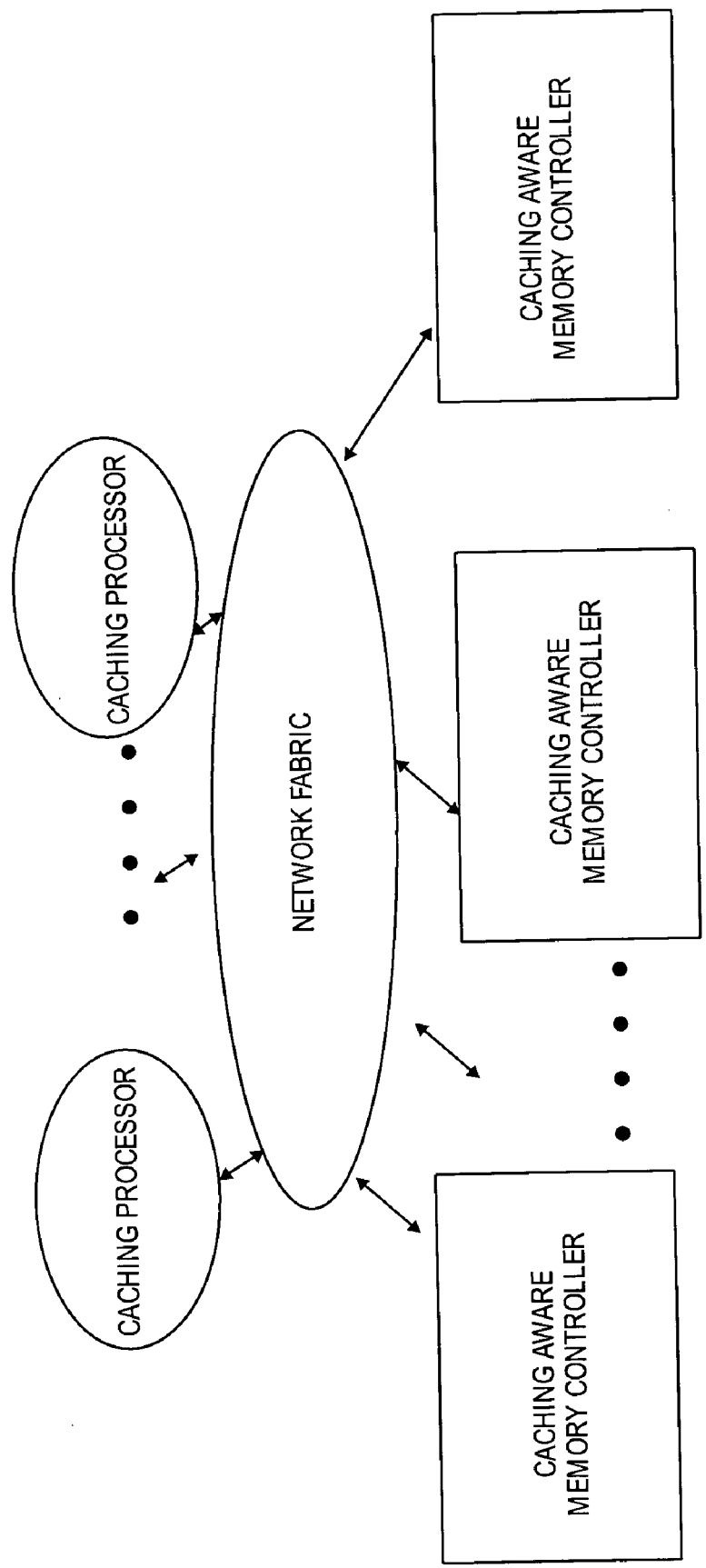
FIG. 7 is a protocol architecture as utilized by one embodiment.

Also, the claimed subject matter depicted in the previous Figures may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone, or any wireless product). For example, a machine-accessible medium includes machine-readable storage mediums such as read only memory (ROM); random access memory (RAM); magnetic disk storage media; optical storage media; flash memory devices; and transitory mediums such as electrical, FIG. 7 is a high level, simplified abstraction of a protocol architecture as utilized by one embodiment. The fabric facilitates transporting messages from one protocol (caching processor agent or caching aware memory controller agent) to another protocol for a point to point network. For example, the network fabric adheres to a layered protocol scheme and may comprise either or all of: a link layer, a physical layer, a protocol layer, a routing layer, a transport layer. The layers are depicted in connection with FIG. 8. The link layer facilitates the initialization of the link, the protocol defines the cache coherence, the routing and transport layers facilitate different system configurations and are optional. The layered protocol scheme is not limited to the depicted layers since different system configurations may select to use some or all of the depicted layers. The fabric facilitates transporting messages from one protocol (home or caching agent) to another protocol for a point to point network. In one aspect, the figure depicts a cache coherence protocol's abstract view of the underlying network.

Figure 8:
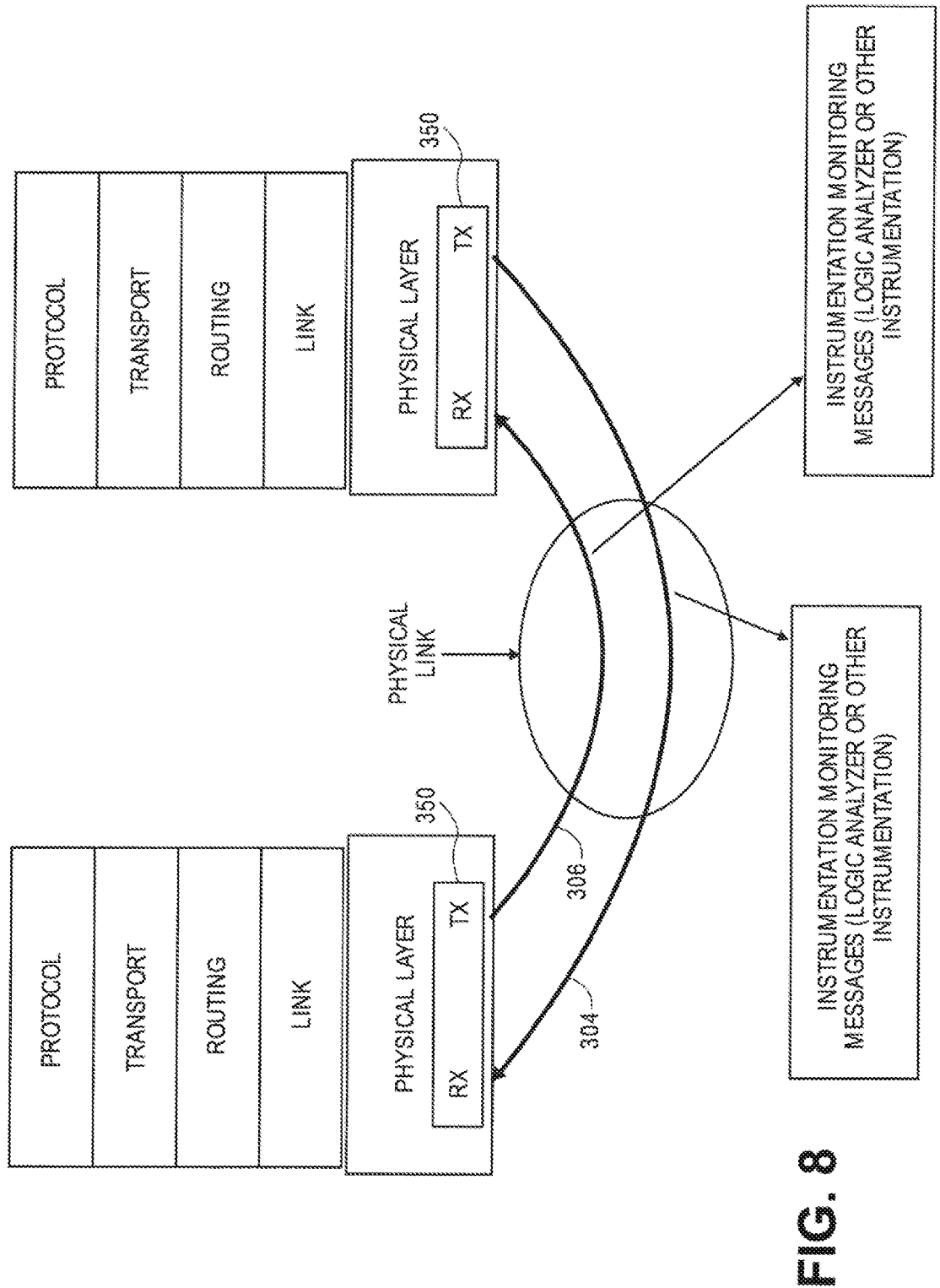
FIG. 8 is a block diagram of an apparatus for a physical interconnect for a point to point connection utilized in accordance with the claimed subject matter.

FIG. 8 is a block diagram of an apparatus for a physical interconnect utilized in accordance with the claimed subject matter. In one aspect, the apparatus depicts a physical layer for a cache-coherent, link-based interconnect scheme for a processor, chipset, and/or 10 bridge components. For example, the physical interconnect may be performed by each physical layer of an integrated device. Specifically, the physical layer provides communication between two ports over a physical interconnect comprising two uni-directional links. Specifically, one unidirectional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bidirectional links, etc.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

What is claimed is:

1. An apparatus comprising:
    a sample logic to sample a finite number (N) of operations of a predetermined transaction type of a thread, wherein the logic includes
        a counter to count a number of cycles between a dispatch of each of the N operations of the predetermined transaction type and a completion of each of the N operations of the predetermined transaction type, and
        a thread specific accumulator to add the number of cycles between the dispatch of each the N operations of the predetermined transaction type and the completion of each of the N operations predetermined transaction type to generate a value of a total number of cycles between the dispatch of the N operations of the predetermined transaction type and the completion the N operations of the predetermined transaction type; and
    a calculation logic to calculate a thread specific metric for the thread-by dividing the value generated by the thread specific accumulator by N, wherein the thread specific metric is used to set a pre fetch aggressiveness index for the processor and a plurality of latency trip points, wherein prefetching for the processor will change accordingly for each of the plurality of trip points.

2. The apparatus of claim 1 wherein the thread specific metric represents an average load latency of a system that incorporates the processor.

3. The apparatus of claim 1 wherein the thread specific metric is calculated for a predetermined level of cache that is coupled to the processor.

4. The apparatus of claim 1 wherein the thread specific metric is calculated for all demand accesses of a system that incorporates the processor.

5. The apparatus of claim 1 wherein the processor has a first processor core and a second processor core, both the first and second processor cores to support execution of multiple threads.

6. The apparatus of claim 1 wherein the thread specific metric is to be stored into a configuration and status register to allow an operating system software the ability to configure the prefetch aggressiveness index.

7. An article of manufacture:
    a machine-readable storage medium having a plurality of machine readable instructions stored thereon, wherein when the instructions are executed by a system that has at least one processor and a cache memory that supports execution of multiple threads performs a method comprising:
        analyzing a thread specific metric during a context switch; and
        prefetching a number of lines from the cache memory, the number of lines based at least in part on the thread specific metric, wherein the thread specific metric represents an average load latency of the system and is used to set a plurality of latency trip points, wherein the prefetching will change accordingly for each of the plurality of trip points.

8. The article of manufacture of claim 7 wherein the number of lines prefetched is more than were prefetched prior to the context switch if the thread specific metric is below a predetermined load latency for the system.

9. The article of manufacture of claim 7 wherein the number of lines prefetched is more than were prefetched prior to the context switch if the thread specific metric is above a predetermined load latency for the system.

10. The article of manufacture of claim 7 wherein the article of manufacture is an operating system or a managed runtime environment.

11. A processor comprising:
    an execution resource to execute a plurality of threads, the processor to prefetch a number of cache lines from a cache memory, the number of cache lines to be determined by a thread specific metric;
    a sample logic to sample a finite number (N) of operations of a predetermined transaction type of a thread;
    a counter to count a number of cycles between a dispatch of each of the N operations of the predetermined transaction type and a completion of each of the N operations of the predetermined transaction type;
    a thread specific accumulator to add the number of cycles counted for each of the N operations between the dispatch of the predetermined transaction type and the completion of the predetermined transaction type for each executed thread to generate total value of cycles; and calculation logic to calculate a thread specific metric for the thread by dividing the value generated by the thread specific accumulator by N, wherein the thread specific metric is used to set a pre fetch aggressiveness index for the processor and a plurality of latency trip points, wherein prefetching for the processor will change accordingly for each of the plurality of trip points.

12. The processor of claim 11 wherein the predetermined transaction type is a demand load instruction.

13. The processor of claim 11 wherein the processor supports execution of multiple threads with at least a first logical processor and a second logical processor.

14. The processor of claim 11 wherein the processor supports a layered protocol interface to communicate with other integrated devices.

15. A system comprising:
a dynamic random access memory; and
at least one processor, coupled to the dynamic random access memory, the processor including execution resources to support execution of a plurality of instruction threads concurrently, wherein the processor includes
    a pre-fetching control block to prefetch a number of cache lines from a cache memory coupled to the processor, based at least in part on a thread specific metric,
    a sample logic to sample a finite number (N) of operations of a predetermined transaction type of a thread,
    a counter to count a number of cycles between a dispatch of each of the N operations of the predetermined transaction type and a completion of each of the N operations of the predetermined transaction type,
    a thread specific accumulator to store add the number of cycles counted for each of the N operations between the dispatch of the predetermined transaction type and the completion of the predetermined transaction type for each executed thread to generate total value of cycles, and
    calculation logic to calculate a thread specific metric for the thread by dividing the value generated by the thread specific accumulator by N, wherein the thread specific metric is used to set a pre fetch aggressiveness index for the processor and a plurality of latency trip points, wherein prefetching for the processor will change accordingly for each of the plurality of trip points.

16. The system of claim 15 further comprising an interface that supports a layered protocol that allows the processor to communicate with the dynamic random access memory.

17. The system of claim 15 wherein the processor has at least a first processor core and a second processor core.

18. A method comprising:
calculating a thread specific metric for a predetermined transaction type of an executed thread, by
    for each operation of the predetermined transaction type executed in the thread,
        counting a number of cycles between a dispatch of the operation of the predetermined transaction type and a completion of the operation of the predetermined transaction type,
    storing the number of cycles, and
    dividing the number of cycles by the number of operations of the predetermined transaction type executed in the thread
to generate a thread specific metric; and
prefetching a number of cache lines, the number of cache lines based at least in part on the thread specific metric, wherein the number of cache lines to prefetch is defined by an aggressiveness index value and a plurality of latency trip points set by the thread specific metric.

* * * * *